(12) United States Patent
Tatara et al.

(10) Patent No.: US 8,128,777 B2
(45) Date of Patent: Mar. 6, 2012

(54) METHOD AND APPARATUS OF REMOVING WEFT OF CORD FABRIC FOR TOPPING SHEET

(75) Inventors: Tetsuo Tatara, Osaka (JP); Tomoyuki Takatsuka, Osaka (JP); Hirokatsu Mizukusa, Osaka (JP); Osamu Fujiki, Osaka (JP)

(73) Assignee: Toyo Tire & Rubber Co., Ltd., Osaka-shi, Osaka (JP)

( * ) Notice: Subject to any disclaimer, the term of this patent is extended or adjusted under 35 U.S.C. 154(b) by 588 days.

(21) Appl. No.: 12/097,356

(22) PCT Filed: Dec. 16, 2005

(86) PCT No.: PCT/JP2005/023170
§ 371 (c)(1),
(2), (4) Date: Mar. 16, 2009

(87) PCT Pub. No.: WO2007/069335
PCT Pub. Date: Jun. 21, 2007

(65) Prior Publication Data
US 2009/0249597 A1    Oct. 8, 2009

(51) Int. Cl.
*B32B 37/00*   (2006.01)
*B32B 38/04*   (2006.01)
*B32B 37/10*   (2006.01)

(52) U.S. Cl. ........ 156/256; 156/270; 156/181; 156/248; 156/281; 156/406.4; 156/705; 156/701; 156/754; 156/750; 28/170; 28/143; 139/116.1; 139/116.2; 134/15; 134/104.2; 134/122 R; 225/97

(58) Field of Classification Search ............... 28/170, 28/143; 139/116.1, 116.2; 156/705, 701, 156/754, 750, 270, 256, 181, 248, 281, 406.4; 134/15, 104.2, 122 R; 225/97
See application file for complete search history.

(56) References Cited

U.S. PATENT DOCUMENTS 3,128,577 A * 4/1964 Guibert et al. ............. 451/36
3,137,882 A * 6/1964 Blanchard ................. 15/308
(Continued)

FOREIGN PATENT DOCUMENTS

JP    61-113877 A    5/1986
(Continued)

OTHER PUBLICATIONS

International Search Report of PCT/JP2005/023170, date of mailing Mar. 20, 2006.

*Primary Examiner* — Linda L Gray
(74) *Attorney, Agent, or Firm* — Westerman, Hattori, Daniels & Adrian, LLP

(57) ABSTRACT

The invention can firmly and easily remove a finely divided weft piece without leaving the weft piece by constituting a method and an apparatus of removing weft from a cord fabric for a topping sheet in a calender line for topping rubber on a number of pieces of aligned cords by a calender roll. In the midst of transferring a cord fabric (F) transferred to a calender apparatus, weft is finely divided by passing the cord fabric (F) through weft dividing means, thereafter, a plurality of blades (45) arranged movably in a width direction on an upper face side of the cord fabric (F) are reciprocally moved in the width direction over an entire width thereof to be brought into contact with the cord fabric (F), and the divided weft piece (W1) is wiped off to remove by respectively striking respective cords (C) of the cord fabric (F) by the respective blades (45).

2 Claims, 6 Drawing Sheets

U.S. PATENT DOCUMENTS

| | | | |
|---|---|---|---|
| 3,370,982 A * | 2/1968 | Hayunga | 134/9 |
| 3,615,814 A * | 10/1971 | Ott et al. | 134/1 |
| 4,594,748 A * | 6/1986 | Warfvinge | 15/308 |
| 7,115,181 B2 * | 10/2006 | Tanaka et al. | 156/259 |

FOREIGN PATENT DOCUMENTS

| | | |
|---|---|---|
| JP | 5-200910 A | 8/1993 |
| JP | 7-34379 A | 2/1995 |
| JP | 11-100746 A | 4/1999 |

\* cited by examiner

METHOD AND APPARATUS OF REMOVING WEFT OF CORD FABRIC FOR TOPPING SHEET

TECHNICAL FIELD

The present invention relates to a method and an apparatus of removing weft of a cord fabric for a topping sheet in a calender line for fabricating a topping sheet by aligning a number of pieces of cords and covering rubber thereon.

BACKGROUND ART

As an industrial material of a tire constituting member or the like of carcass ply of a tire or the like, as shown by FIG. 9 and FIG. 10, there is used a so-to-speak topping sheet A constituting core members for reinforcement by a number of pieces of cords C mainly made of a fabric and topping (covering) rubber R at least on one face (normally, both faces).

In a background art, according to the topping sheet A, as shown by FIG. 11, a so-to-speak cord fabric F woven by constituting warp by the cord C made of a fabric or the like and coarsely striking slender weft W serving as a connection at respective required intervals in a longitudinal direction is used for a core member as it is, and rubber is topped on at least on one face of the cord fabric F by a roll-like calender apparatus.

However, according to the topping sheet using the cord fabric F as the core member as it is, when the topping sheet is used for a tire constituting member of carcass ply or the like, not only the weft in the fabric does not serve to reinforce the tire effectively, but there is a concern of deteriorating a tire function by bringing about a failure in uniformity, a failure in separation or the like of the tire by presence of the weft, and therefore, in recent years, it is proposed to remove the weft from the cord fabric and use only the cord constituting the warp for the core member of the topping sheet in an aligned state.

For example, Patent Reference 1 mentioned below discloses a method of removing weft from the cord fabric at a step preceding to a rubber coating step for using only the cord constituting the warp of the cord fabric for the core member of the topping sheet. Further, Patent Reference 2 discloses to remove weft while transferring a cord fabric, thereafter, pass only a number of pieces of cords at a portion of a roll type calender apparatus in an aligned state and top rubber in a calender line.

Meanwhile, as means for removing the weft from the cord fabric, according to the method disclosed in Patent Reference 1, the weft is finely divided by running the cord fabric in the longitudinal direction and passing the cord fabric between two pieces of dividing rolls having dividing rings fitted to each other in zigzag, successively thereto, a number of divided weft pieces are separated from the cord by a rotating brush and the separated weft pieces are sucked to remove by sucking means.

However, the rotating brush is rotated centering on an axis center in a width direction of the cord fabric, and brush hair thereof is rotated between the cords along the longitudinal direction, and therefore, when the weft piece is caught by the cord, there is a case in which the weft piece is entangled with the cord and cannot be removed.

Further, Patent Reference 2 shows to combinedly use the apparatus of cutting weft at a center portion in a width direction, thereafter, the cut weft is pulled to draw in a side direction by cutting to separate edge string on both side portions other than the weft removing apparatus similar to that of Patent Reference 1.

However, according to the system of drawing to remove the weft, a drawing resistance is large and there is a concern that the weft is cut in the midway and cannot be drawn to remain. Further, although the drawing apparatus is combined with the apparatus of the divide-to-remove system therefor, there is a case in which the divided weft piece is still entangled with the cord to remain. When the weft piece is assumedly entangled with the cord to remain, an aligning state is disturbed by detaching the weft piece from a grooved roll at a portion of a calender apparatus mentioned later, or a failure in separation or the like is liable to be brought about when the topping sheet is used as the tire constituting member.

Patent Reference 1: JP-A-61-113877
Patent Reference 2: JP-A-7-34379

DISCLOSURE OF THE INVENTION

Problems that the Invention is to Solve

The invention provides a method and an apparatus of removing weft from a cord fabric for a topping sheet at a calender line for topping rubber while aligning and transferring a number of pieces of cords at constant intervals, in which a finely divided weft piece can firmly and easily be removed without leaving the weft piece.

Means for Solving the Problems

The invention has been carried out in order to resolve the problem and is a method of removing weft from a cord fabric for a topping sheet woven by constituting warp by a number of pieces of cords in a calender line for topping rubber to the number of pieces of aligned cords by a calender roll, wherein the weft is finely divided by passing the cord fabric through weft dividing means in the midst of transferring the cord fabric transferred to the calender apparatus, thereafter, a plurality of blades arranged movably in a width direction on an upper face side of the cord fabric is reciprocally moved over an entire width in the width direction to be brought into contact with the cord fabric, and a divided weft piece is wiped off to remove such that the respective cords of the cord fabric are continuously struck by the respective blades.

According to the method, by striking the respective cords constituting a number of pieces of warp after finely dividing the weft by the plurality of blades while transferring the respective cords in an aligned state, the respective cords are flipped to be vibrated and a portion thereof intersected with the weft is struck by the blade. As a result, the divided fine weft piece adhered to the cord can easily and firmly be separated from the cord by disengaging adherence by an adhering agent treatment at the portion intersected with the cord, thereby, the divided weft piece can be wiped off and can be removed without hardly leaving the weft piece.

In the weft removing method, particularly, it is preferable that an endless pivoting member which pivots reciprocally is provided by being spaced apart in a direction of transferring the cord fabric by an interval, a plurality of the blades are attached at respective predetermined intervals in a longitudinal direction of the pivoting member, and at two positions of a reciprocally moving portion and a returning portion, by reciprocally pivoting the pivoting member, the divided weft piece is wiped off from the cord such that the cord of the cord fabric is continuously struck in directions opposed to each other by the respective blades. Thereby, the number of fine weft pieces are further firmly divided from the cord and an efficiency of wiping off to remove the fine weft piece can further be promoted.

Further, according to other aspect of the invention, there is provided a weft removing apparatus used for embodying the above-described method including weft dividing means for finely dividing the weft by passing the cord fabric in the midst of transferring the cord fabric transferred by a calender apparatus, and a wipe off apparatus of separating a divided weft piece from the cord constituting the warp to wipe off, wherein the wipe off apparatus is attached with a plurality of sheets of blades hung down from a member movable in a width direction over an entire width thereof on an upper face side of the cord fabric to constitute a line in a moving direction and to be able to be brought into contact with the cord fabric, and is constituted to wipe off the divided weft piece by continuously striking the cord of the cord fabric by the blade.

According to the weft removing apparatus, after finely dividing the weft in the fabric by passing the cord fabric transferred to the calender apparatus through the weft dividing means, by passing the cord fabric through a portion of the wipe off apparatus successive thereto, the respective cords constituting warp are continuously struck to vibrate to be flipped by the blade reciprocally moving in the width direction of the cord fabric at the portion of the wipe off apparatus, also the finely divided weft piece is struck, the weft piece is firmly wiped off from the cord, thereby, the method can excellently be embodied.

In the weft removing apparatus, it is preferable that a lower side of the wipe off apparatus is provided with a dust collecting hopper for sucking to recover the weft piece wiped off by the blade by sucking means, thereby, the wiped off weft piece can firmly be sucked to recover without being scattered to other place.

Further, in the weft removing apparatus, it is preferable that the member movable in the width direction of the cord fabric comprises an endless pivoting member reciprocally pivoting by being spaced apart in a direction of transferring the cord fabric by an interval, attached with the plurality of blades at respective predetermined intervals in a longitudinal direction of the pivoting member, and is constituted by being provided such that the cord of the cord fabric is struck continuously in directions opposed to each other by the respective blades at two positions of a reciprocally moving portion and a returning portion by reciprocally pivoting the pivoting member. Thereby, the weft piece can firmly be separated from the cord and can be wiped.

In the weft removing apparatus, it is preferable that the blade comprises a thin plate having an elasticity and is constituted by being provided such that a plate face thereof is aligned in a moving direction. Thereby, the respective cords can powerfully be struck to be flipped by utilizing the elasticity of the blade, and an effect of wiping off the weft piece can be promoted.

Advantage of the Invention

As described above, according to the method and the apparatus of removing the weft of the cord fabric in the calender line in the invention, by continuously striking to flip the cord constituting the warp and the finely divided weft piece by the plurality of blades, the weft piece can firmly be separated and wiped off from the cord, and therefore, the weft piece can firmly be removed without leaving the weft piece. Particularly, by continuously bringing the plurality of blades constituting a line shape into contact with the respective cords, the weft piece in a state of being adhered to the portion intersected with the cord by the adhering agent treatment can firmly be separated and can be removed. Therefore, a quality of the topping sheet constituting the core member for reinforcement only by the cord without the weft can be promoted, which can contribute to a reduction in a failure of separation or the like when the topping sheet is used for a tire constituting member.

BEST MODE FOR CARRYING OUT THE INVENTION

Next, an embodiment of the invention will be explained based on an example shown by drawings.

Figure 1:
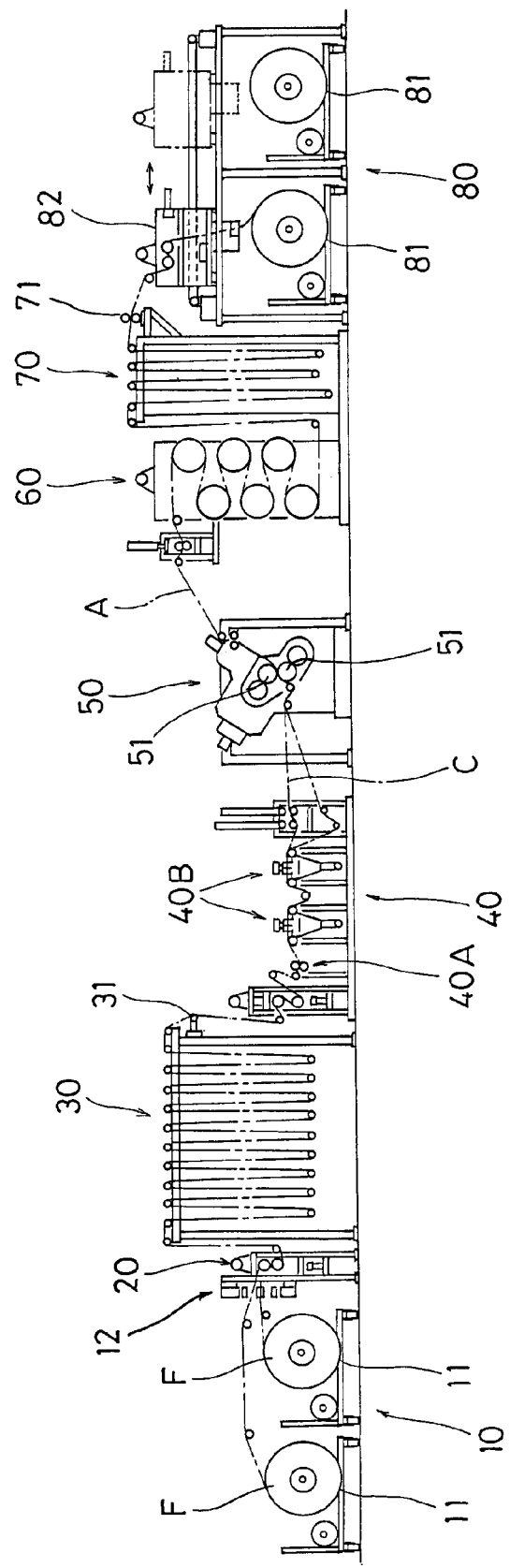
FIG. 1 is a step diagram showing an outline of a calender line of fabricating a topping sheet which does not include weft.
Figure 9:
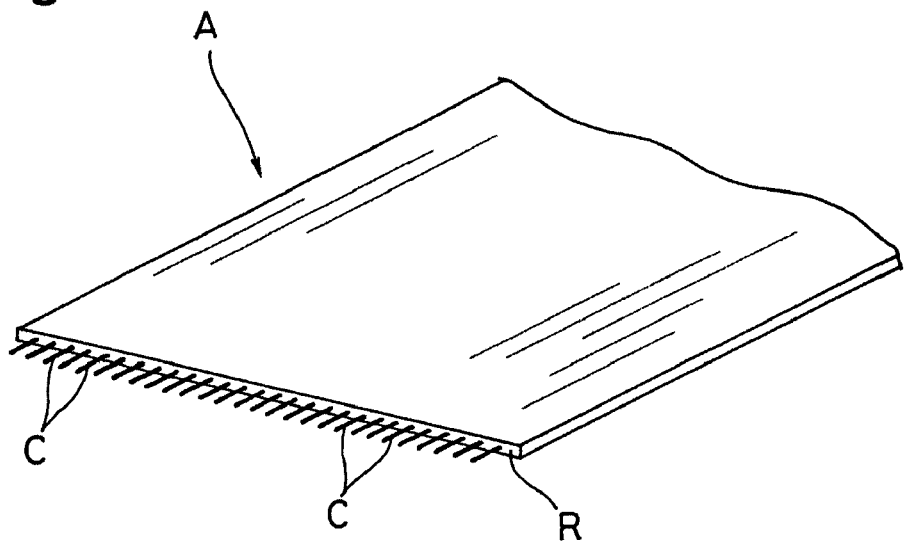
FIG. 9 is a perspective view substantially showing a topping sheet.
Figure 10:
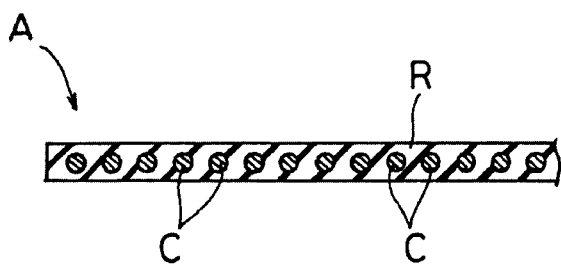
FIG. 10 is a sectional view enlarging a portion of the topping sheet.
Figure 11:
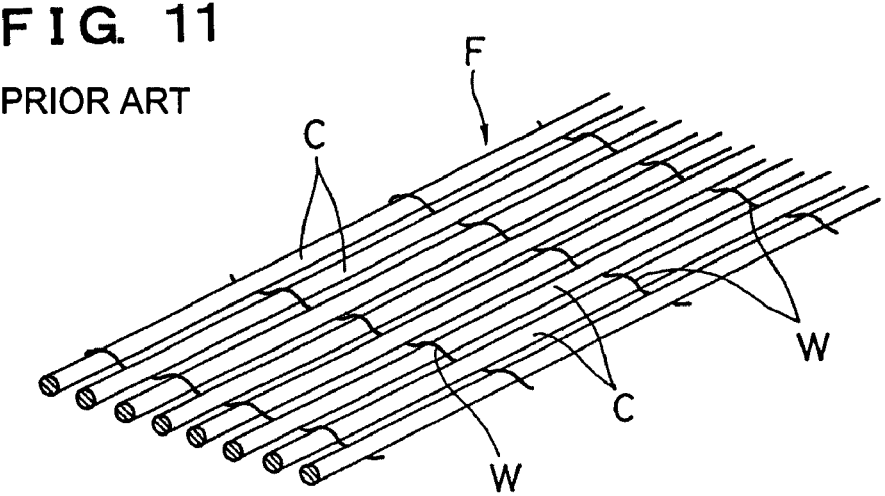
FIG. 11 is a perspective view substantially showing a cord fabric.

FIG. 1 shows an outline of a calender line which is a calender line for fabricating the topping sheet A as shown by FIG. 9 and FIG. 10 used for a tire constituting member of carcass ply or the like of a tire, in which particularly, the weft W connecting the respective cords C is removed from a cord fabric F as shown by FIG. 11 constituted being woven by constituting warp by the cord C constituting the core member for reinforcement, thereafter, topping the rubber R at least on one face (both faces in the drawing) thereof.

In the drawing, numeral 10 designates a portion of supplying the cord fabric F as shown by FIG. 11 woven by using a number of pieces of the cords C made of a fabric as the warp and arranging the weft W at respective required intervals in a longitudinal direction. The cord fabric F is provided with a width in correspondence with a width of the topping sheet A constituting an object of fabrication, wound in a roll-like shape in a state of being subjected to a predetermined heat treatment and an adhering agent treatment and supported by a cassette type carriage 11. In the case of the drawing, the supply portion 10 is installed with two pieces of the carriages 11, 11 for supporting the cord fabric F in the roll-like shape, and when the cord fabric F of one of the carriages 11 is terminated, by bonding a front end of the cord fabric F of other of the carriages 11 to the terminated rear end, the cord fabric F is made to be able to be drawn continuously. Numeral 12 designates a joint apparatus portion of the cord fabric F.

Further, when the topping sheet A having a comparatively slender width is fabricated, normally, there is used the cord fabric F constituted by cutting a cord fabric woven by a wide width into a necessary width to wind.

Numeral 20 in the drawing designates an apparatus of drawing the cord fabric F from the supply portion 10, numeral 30 designates a festoon apparatus, and an end portion on a delivery side of the apparatus is provided with an apparatus 31 of centering the cord fabric F. Numeral 40 designates a weft removing apparatus provided successive to the festoon apparatus 30, and is provided to slenderly divide the weft W provided to the cord fabric F by several cm to separate to remove from the cord C as described later.

Numeral 50 in the drawing designates a roll type calender apparatus for topping the rubber R from upper and lower faces of the cord C by passing a number of pieces of the cords C removed of the weft W at the weft removing apparatus 40 and transferred by way of a dancer apparatus or the like between a pair of calender rolls 51, 51 in an aligned state. Numeral 60 in the drawing designates an apparatus of cooling the topping sheet A topped with the rubber by passing the calender apparatus 50 and by way of the dancer apparatus, numeral 70 designates a festoon apparatus successive thereto, and an end portion on a delivery side of the festoon apparatus 70 is provided with a centering apparatus 71 of centering the topping sheet A. Numeral 80 designates a reeling apparatus provided to reel the topping sheet A transferred by being centered by the centering apparatus 71 to a reel carriage 81. In the case of the drawing, the reel apparatus 80 is installed with two pieces of the reel carriages 81, 81 on front and rear sides thereof to alternately reel the topping sheet A one by one. Numeral 82 designates a reel position switching apparatus for switching a position of reeling the topping sheet A to respective positions of the carriages, which is provided movably to the front and rear sides.

Figure 2:
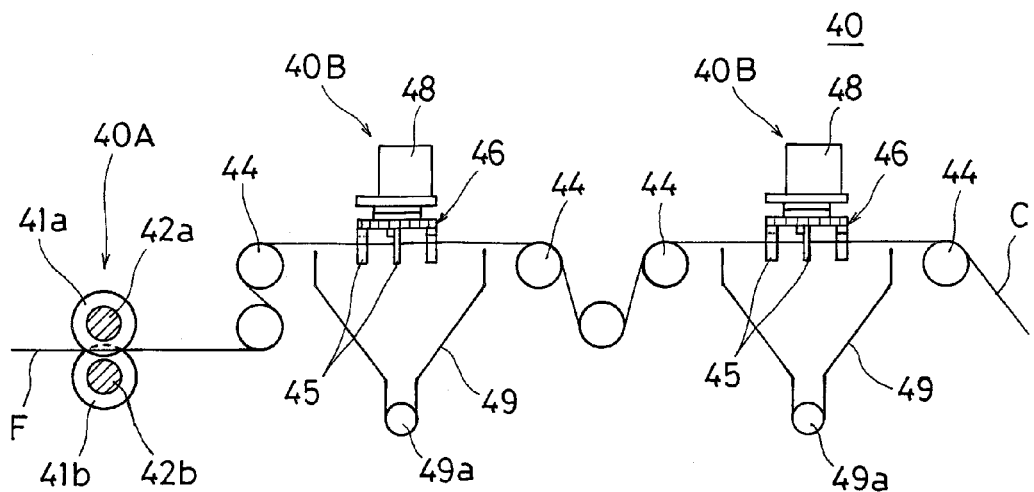
FIG. 2 is an outline view enlarging a portion of a weft removing apparatus.

Further, as shown by FIG. 2, the weft removing apparatus 40 provided at a midway of transferring the cord fabric F for the topping sheet transferred to the calender apparatus 50 is provided with weft dividing means 40A of slenderly dividing the weft W by passing the cord fabric F, and a wipe off apparatus 40B for separating the slenderly divided weft piece W1 from the cord C constituting the warp to wipe off successive thereto. In the case of FIG. 2, two pieces of the wipe off apparatus 40B are continuously provided.

Figure 3:
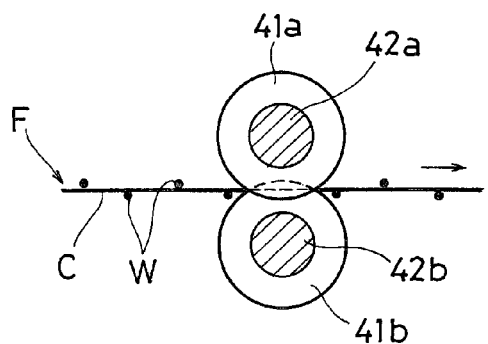
FIG. 3 is a sectional view taken along a direction of transferring a cord fabric of a portion of weft dividing means of the weft removing apparatus of the invention.
Figure 4:
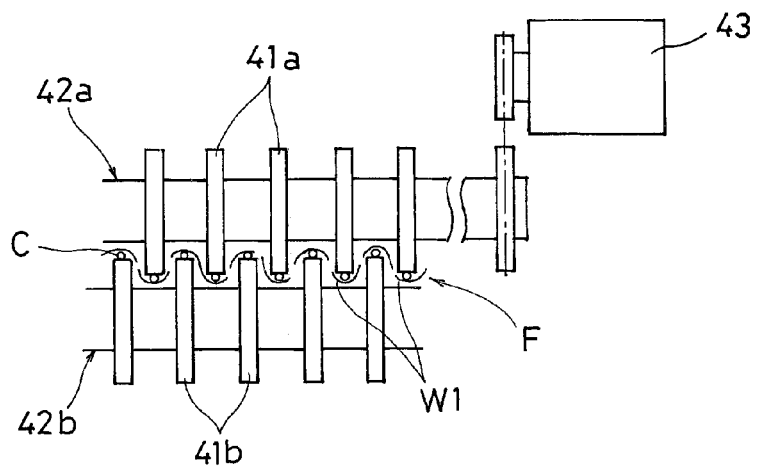
FIG. 4 is a sectional view taken along a width direction of a cord fabric at the portion of the weft dividing means of the same.
Figure 5:
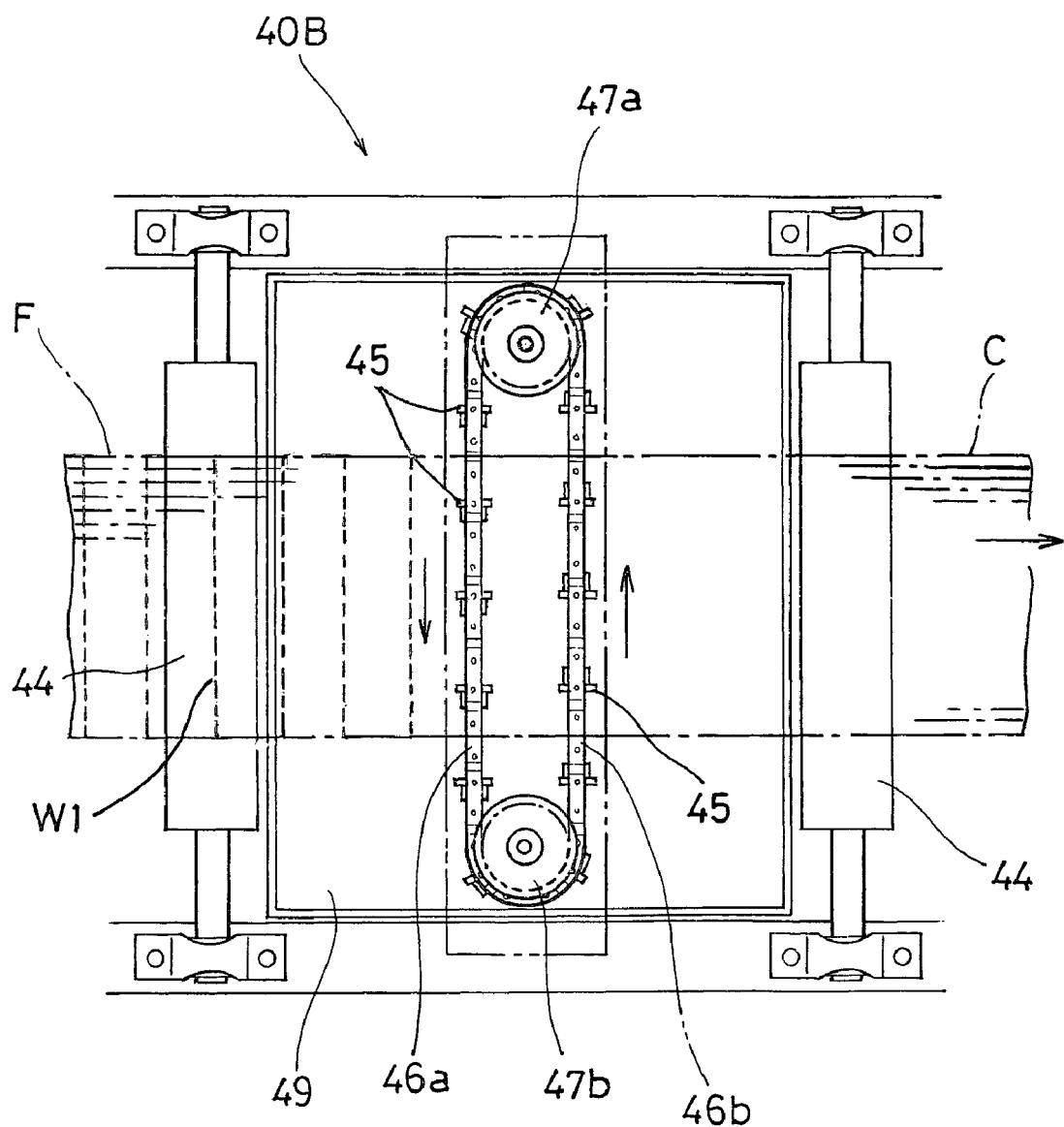
FIG. 5 is a plane view of a wipe off apparatus of the same.
Figure 6:
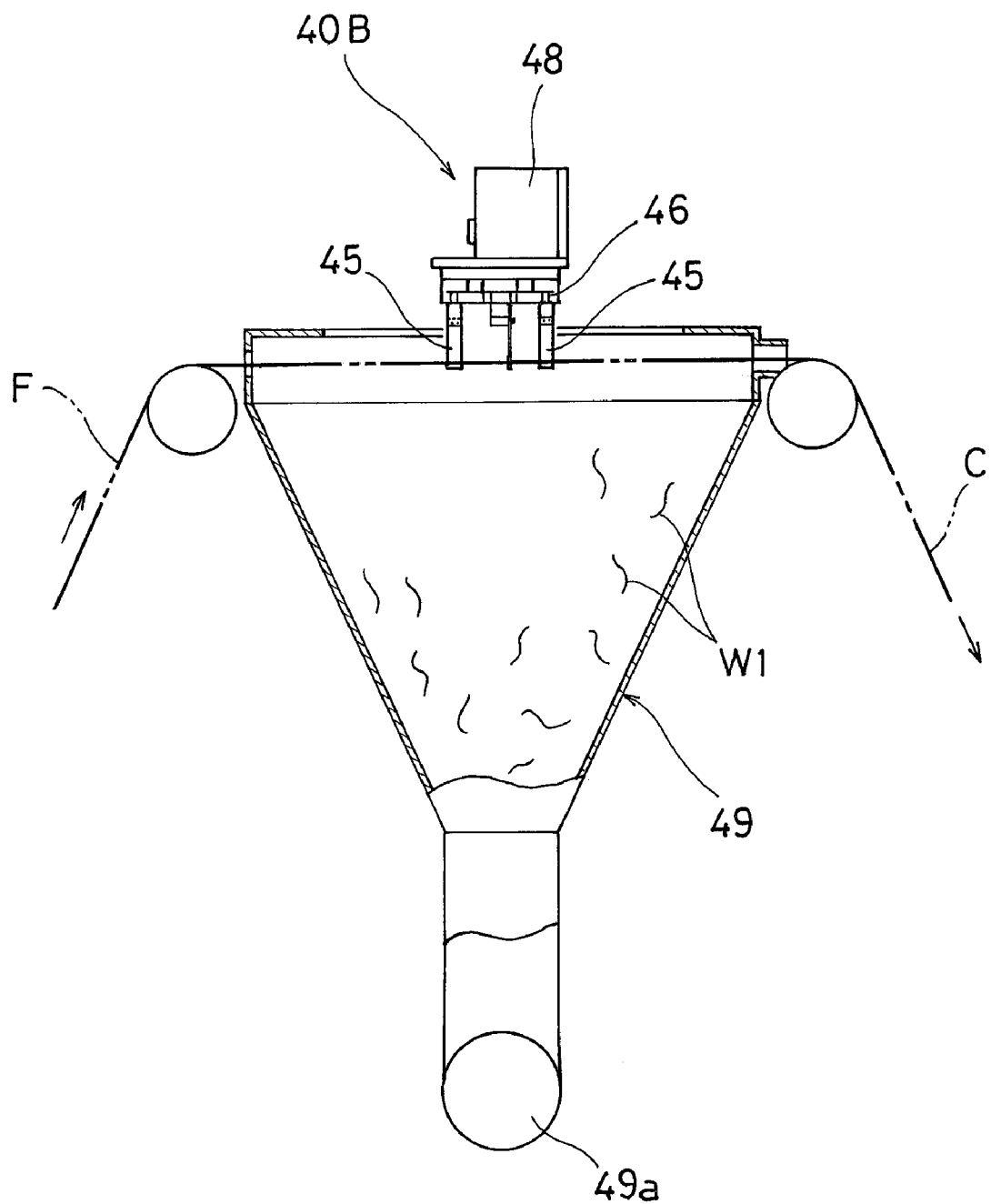
FIG. 6 is a sectional view taken along the direction of transferring a cord fabric of the wipe off apparatus of the same.
Figure 7:
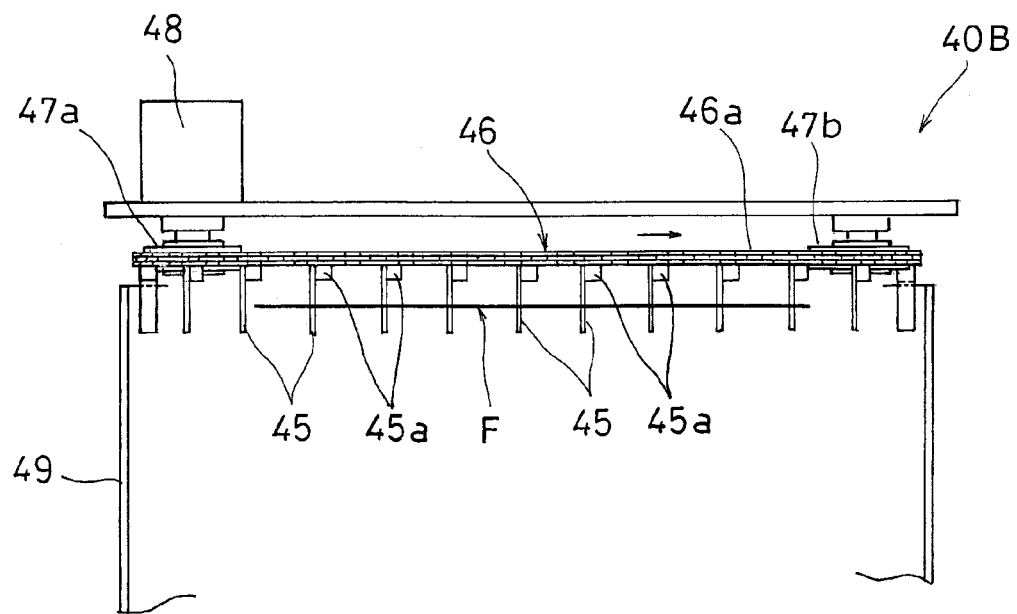
FIG. 7 is a sectional view taken along a width direction of a cord fabric of the wipe off apparatus of the same.

As enlarged to shows in FIG. 3 and FIG. 4, the weft dividing means 40A is constituted by including two pieces of a pair of upper and lower dividing rolls 42a and 42b outer peripheries of which are formed with dividing rings 41a and 41b fitted to each other in zigzag and constituted to be able to slenderly divide the weft W by passing the cord fabric F between the dividing rolls 42a and 42b. Numeral 43 designates means for driving the dividing rolls 42a and 42b. As the weft dividing means, other cutting means capable of slenderly dividing the weft by a mechanism other than the roll can also be utilized.

Further, the wipe off apparatus 40B arranged successive to the weft dividing means 40A is constituted by attaching a plurality of sheets of blades 45 hung from a member movable in a width direction over an entire width thereof on an upper face side of the cord fabric F and aligned in a moving direction to be able to be brought into contact with the cord fabric F and is constituted to wipe off the divided weft piece W1 by continuously striking the cord C of the cord fabric F by the blade 45.

In the case of the illustrated example, as enlarged to be shown by FIG. 5 through FIG. 8, as the member movable in the width direction, there is provided an endless pivoting member 46 reciprocally pivoted by being spaced apart by an interval in a direction of transferring the cord fabric F, the plurality of sheets of blades 45 hung down to be able to be brought into contact with the cord fabric F are attached at predetermined intervals in a pivoting direction (moving direction) of the pivoting member 46, and the cord C of the cord fabric F is constituted to be struck continuously in opposed directions by the respective blades 45 at two positions of a reciprocally moving portion 46a and a returning portion 46b by reciprocally pivoting the pivoting member 46.

The pivoting member 46 is constituted by, for example, an endless chain hung by sprockets 47a and 47b having axis centers in an up and down direction on an outer side of a portion of transferring the cord fabric F and is provided to be reciprocally pivot by traversing the cord fabric F in a width direction by constituting an interval in correspondence with diameters of the sprockets 47a and 47b. Numeral 48 designates driving means of a motor or the like connected to the sprocket 47a on one side for driving the pivoting member 46.

Further, the blade 45 is constituted by a longitudinally long thin plate having a pertinently flexible elasticity of a synthetic resin or the like, attached to be fixed to an attaching portion 45a provided at each constant interval in a longitudinal direction of a lower face of the pivoting member 46 such that a plate face thereof is aligned in the pivoting direction (moving direction) and is made to be able to be brought into contact with the respective cords C by the plate face powerfully by utilizing the elasticity. The interval of attaching the blade 45 can pertinently be set in consideration of an operation of striking the cord C and an effect of wiping off the weft piece.

Although the blade 45 may be constituted to wipe off the weft piece W1 by the operation of striking the cord C, may be constituted by any material and any shape or the like, and may be embodied by, for example, a metal thin plate, or a blade constituted by a longitudinally long elliptical shape, the blade 45 is preferably constituted by a thin plate of a synthetic resin having a flexible elasticity in view of the operation of striking the cord C and protection of the cord C, further, preferably constituted by a rounded plate member such as a plate member constituted by a rectangular shape having rounded corner portions since the plate member does not impair the cord C.

A lower side of the wipe off apparatus 40B is provided with a dust collecting hopper 49 constituting a funnel-like shape for sucking to recover the weft piece W1 wiped off by the blade 45. Sucking means (not illustrated) is connected by way of a duct 49a continuously provided to a center of a lower portion of the dust collecting hopper 49.

Numerals 44, 44 in the drawing designate guide rollers of the cord fabric F provided at front and rear sides of the dust collecting hopper 49 and are provided to transfer the cord fabric F along an upper opening of the dust collecting hopper 49.

Further, although according to the above-described embodiment, there is shown a case in which the member for reciprocally moving and returning the blade 45 in the width direction is constituted by the pivoting member 46 reciprocally pivoted at positions different from each other, the member can also be embodied by being provided to reciprocally move at the same position by utilizing a reciprocally moving mechanism of a cylinder mechanism or a linear guide motor or the like.

When the topping sheet A is fabricated by the calender line of FIG. 1 having the weft removing apparatus 40, the cord fabric F woven by constituting the warp by the cord C is removed of the weft W by the weft removing apparatus 40, thereafter, transferred to the calender apparatus 50 and is topped with rubber.

According to the weft removing apparatus 40, first, the weft W is finely divided by passing the portion of the weft dividing means 40A as shown by FIG. 3 and FIG. 4. That is, the weft W is finely divided by passing the cord fabric F between the dividing rolls 42a and 42b provided with the dividing rings 41a and 41b on upper and lower sides in zigzag. A number of the divided weft pieces W1 remain in an adhering state by being adhered at a portion thereof intersecting with the cord C since the cord fabric F is subjected to the adhering agent treatment.

In this way, the cord fabric F is passed through the portion of the successive wipe off apparatus 40B in a state of finely dividing the weft W. At the portion of the wipe off apparatus 40B, the plurality of blades 45 are attached to the endless pivoting member 46 reciprocally pivoted in the width direction along the upper face of the transferred cord fabric F in a hanging down state and reciprocally pivoted while being brought into contact with the cord fabric F from the pivoting member 46 over the entire width.

Figure 8:
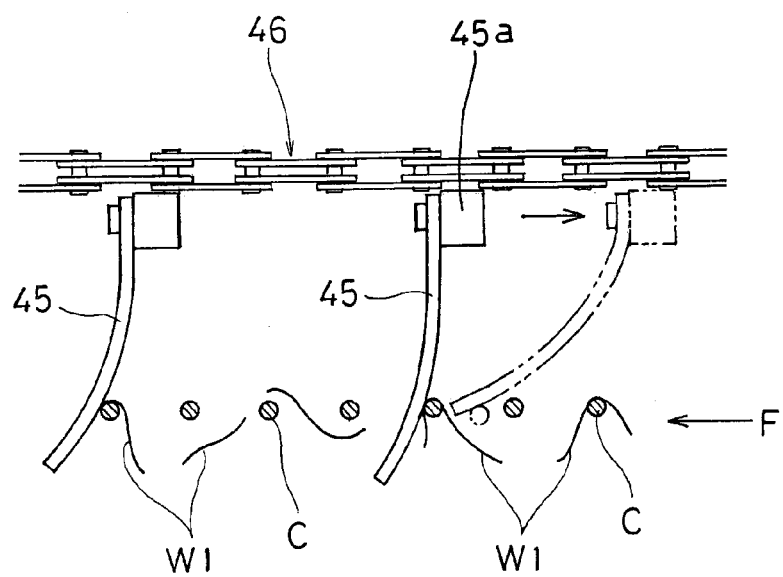
FIG. 8 is an explanatory view of a state of a striking operation by a blade of the wipe off apparatus of the same.

That is, the plurality of blades 45 are pivoted in the width direction while being brought into contact with the respective cords C constituting a number of pieces of warp after finely dividing the weft W to be continuously struck by the blades 45. Thereby, as shown by FIG. 8, the respective cords C are vibrated by being powerfully flipped by the blades 45 and also the portion intersecting with the weft piece W1 is struck by the blade 45. As a result, the divided fine weft piece W1 adhered to the cord C can easily and firmly be detached from the cord C by disengaging adherence by the adhering agent treatment at the portion intersected with the cord C. Therefore, the divided weft piece W1 can be wiped off without hardly leaving the weft piece W1. The wiped-off weft piece W1 is brought to the dust collecting hopper 49 on the lower side connected with the sucking means to be sucked to recover to be removed.

Further, by topping the rubber R on only the number of pieces of cords C after removing the weft W by passing the cords C through the calender apparatus 50, the topping sheet A is continuously fabricated. Thereby, the topping sheet constituting the core member for reinforcement by only the cord without the weft is provided, and occurrence of a failure of separation or the like can be reduced when the topping sheet A is used as the tire constituting member.

Further, although by only arranging one piece of the wipe off apparatus 40B along with the dust collecting hopper 49, the effect of wiping off the divided weft piece can sufficiently achieved, when the apparatus is embodied by providing a plurality of the apparatus such as two thereof as shown by FIG. 1, the effect is further promoted.

INDUSTRIAL APPLICABILITY

The invention can preferably be utilized for removing the finely divided weft when the topping sheet is fabricated by topping rubber by constituting the core member only by the cord by removing the weft from the cord fabric woven by constituting the warp by the cord constituting the core member for reinforcement.

DESCRIPTION OF REFERENCE NUMERALS AND SIGNS

A . . . topping sheet, C . . . cord, F . . . cord fabric, R . . . rubber, W . . . weft, W1 . . . divided weft piece, 10 . . . supply portion, 11 . . . carriage, 12 . . . joint apparatus portion, 20 . . . drawing apparatus, 30 . . . festoon apparatus, 31 . . . centering apparatus, 40 . . . weft removing apparatus, 40A . . . weft dividing means, 40B . . . wipe off apparatus, 41a, 41b . . . dividing rings, 42a, 42b . . . dividing rolls, 43 . . . driving means, 44 . . . guide roller, 45 . . . blade, 45a . . . attaching portion, 46 . . . pivoting member, 46a . . . reciprocating portion, 46b . . . returning portion, 47a, 47b . . . sprockets, 48 . . . driving means, 49 . . . dust collecting hopper, 49a . . . duct, 50 . . . calender apparatus, 51, 51 . . . upper and lower calender rolls, 55 . . . dancer apparatus, 60 . . . cooling apparatus, 70 . . . festoon apparatus, 71 . . . centering apparatus, 80 . . . reeling apparatus, 81 . . . reel carriage, 82 . . . reel position switching apparatus.

The invention claimed is:

1. A method of removing weft of a cord fabric in a calender line which is a method of removing weft from a cord fabric for a topping sheet woven by constituting warp by a number of pieces of cords in a calender line for topping rubber to the number of pieces of aligned cords by a calender roll;

wherein the weft is finely divided by passing the cord fabric through weft dividing means in the midst of transferring the cord fabric transferred to a calender apparatus, thereafter, a plurality of blades arranged movably in a width direction on an upper face side of the cord fabric is reciprocally moved over an entire width in the width direction to be brought into contact with the cord fabric, and a divided weft piece is wiped off to remove such that the respective cords of the cord fabric are continuously struck by the respective blades.

2. The method of removing weft of a cord fabric in a calender line according to claim 1, wherein an endless pivoting member which pivots reciprocally is provided by being spaced apart in a direction of transferring the cord fabric by an interval, a plurality of the blades are attached at respective predetermined intervals in a longitudinal direction of the pivoting member, and at two positions of a reciprocally moving portion and a returning portion, by reciprocally pivoting the pivoting member, the divided weft piece is wiped off from the cord such that the cord of the cord fabric is continuously struck in directions opposed to each other by the respective blades.

* * * * *